United States Patent
Cappello et al.

(10) Patent No.: US 11,792,593 B2
(45) Date of Patent: Oct. 17, 2023

(54) AUDIO PROCESSING

(71) Applicant: Sony Interactive Entertainment Inc., Tokyo (JP)

(72) Inventors: Fabio Cappello, London (GB); Michael Lee Jones, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/452,126

(22) Filed: Oct. 25, 2021

(65) Prior Publication Data

US 2022/0132260 A1 Apr. 28, 2022

(30) Foreign Application Priority Data

Oct. 28, 2020 (GB) ...................... 2017093

(51) Int. Cl.
*H04S 7/00* (2006.01)
*A63F 13/54* (2014.01)

(52) U.S. Cl.
CPC ............... *H04S 7/30* (2013.01); *A63F 13/54* (2014.09); *A63F 2300/6081* (2013.01)

(58) Field of Classification Search
None
See application file for complete search history.

(56) References Cited

U.S. PATENT DOCUMENTS

| | | | |
|---|---|---|---|
| 10,721,521 B1 * | 7/2020 | Robinson | H04R 3/04 |
| 2016/0269712 A1 * | 9/2016 | Ostrover | H04S 7/305 |
| 2019/0104375 A1 | 4/2019 | Laaksonen | |
| 2019/0116450 A1 * | 4/2019 | Tsingos | G10L 21/0232 |
| 2019/0251603 A1 * | 8/2019 | Jaatinen | G06N 3/0454 |

FOREIGN PATENT DOCUMENTS

| | | |
|---|---|---|
| GB | 2558279 A | 7/2018 |
| WO | 2014025752 A1 | 2/2014 |
| WO | 2017205637 A1 | 11/2017 |

OTHER PUBLICATIONS

Combined Search Report and Examination Report for corresponding GB Application No. 2017093.2, 5 pages, dated Apr. 13, 2021.
Extended European Search Report for corresponding EP Application No. 21203279, 8 pages, dated Mar. 4, 2022.

* cited by examiner

*Primary Examiner* — Kenny H Truong
(74) *Attorney, Agent, or Firm* — Matthew B. Dernier, Esq.

(57) ABSTRACT

A method comprises generating a first environment representation for rendering a video representation of a virtual environment; and generating a second environment representation for rendering an audio output at a virtual listening position within the virtual environment in response to sounds generated by one or more virtual sound sources within the virtual environment; in which the first and second environment representations comprise respective different geometrical representations of the virtual environment; in which the step of generating the second environment representation comprises: generating a starting version of the second environment representation; and modifying the starting version of the second environment representation.

11 Claims, 7 Drawing Sheets

AUDIO PROCESSING

BACKGROUND

This disclosure relates to audio processing.

Audio rendering may be performed by various techniques so as to model the audio properties (such as reverberation, attenuation and the like) of a simulated or virtual environment. One example of a suitable technique may be referred to as ray-tracing. This is a technique to generate sound for output at a virtual listening location within the virtual environment by tracing so-called rays or audio transmission paths from a virtual audio source and simulating the effects of the rays encountering objects or surfaces in the virtual environment.

In a physical reality, sound from an audio source hits an object and is absorbed and/or reflected and/or refracted, with the transmission path potentially reaching a listening position such as a user's ear or a microphone. In contrast, in audio rendering systems using audio ray-tracing, the simulation is performed by emitting virtual or simulated "rays" from a virtual listening position such as a virtual microphone and determining what interactions they undergo when they reach an object or a virtual audio source, either directly or after having hit an object or surface.

SUMMARY

It is in this context that the present disclosure arises.

The present disclosure provides a method comprising: generating a first environment representation for rendering a video representation of a virtual environment; and generating a second environment representation for rendering an audio output at a virtual listening position within the virtual environment in response to sounds generated by one or more virtual sound sources within the virtual environment;

in which the first and second environment representations comprise respective different geometrical representations of the virtual environment;

in which the step of generating the second environment representation comprises:

generating a starting version of the second environment representation; and modifying the starting version of the second environment representation.

The present disclosure also provides apparatus comprising a processor configured to:

generate a first environment representation for rendering a video representation of a virtual environment;

generate a second environment representation for rendering an audio output at a virtual listening position within the virtual environment in response to sounds generated by one or more virtual sound sources within the virtual environment;

in which the first and second environment representations comprise respective different geometrical representations of the virtual environment;

in which processor is configured to generate the second environment representation by: generating a starting version of the second environment representation; and modifying the starting version of the second environment representation.

Various further aspects and features of the present disclosure are defined in the appended claims and within the text of the accompanying description.

BRIEF DESCRIPTION OF THE DRAWING

Embodiments of the disclosure will now be described, by way of example only, with reference to the accompanying drawings, in which.

DETAILED DESCRIPTION

The techniques to be discussed here can fall into two example stages of processing.

An entertainment device provides a simulated audio output, for example to a user of the entertainment device. An example application comprises computer gameplay. The user may be listening using headphones, for example built into or associated with a head mountable display, or one or more loudspeakers.

In turn, a model of a virtual environment for use in the audio simulation may be prepared or generated using a separate data processing apparatus, for example in advance of use by the user of the entertainment device.

In other examples, however, the generation stage can be carried out by the entertainment device, even during gameplay. In an example situation, the user creates or varies aspects of a simulated or virtual environment, for example by building or destroying virtual walls or other simulated physical features. In response to the creation of a newly generated simulated physical environment, processes to be discussed below can be performed by the entertainment device in order to generate or at least adjust a simulated audio environment for use in operation and/or gameplay in connection with that simulated physical environment.

With these considerations providing technical context, an example entertainment device will now be described with reference to FIG. 1. An example of a separate data processing apparatus, for example to be used for model generation, will be described with reference to FIG. 8.

Example Entertainment Device

Figure 1:
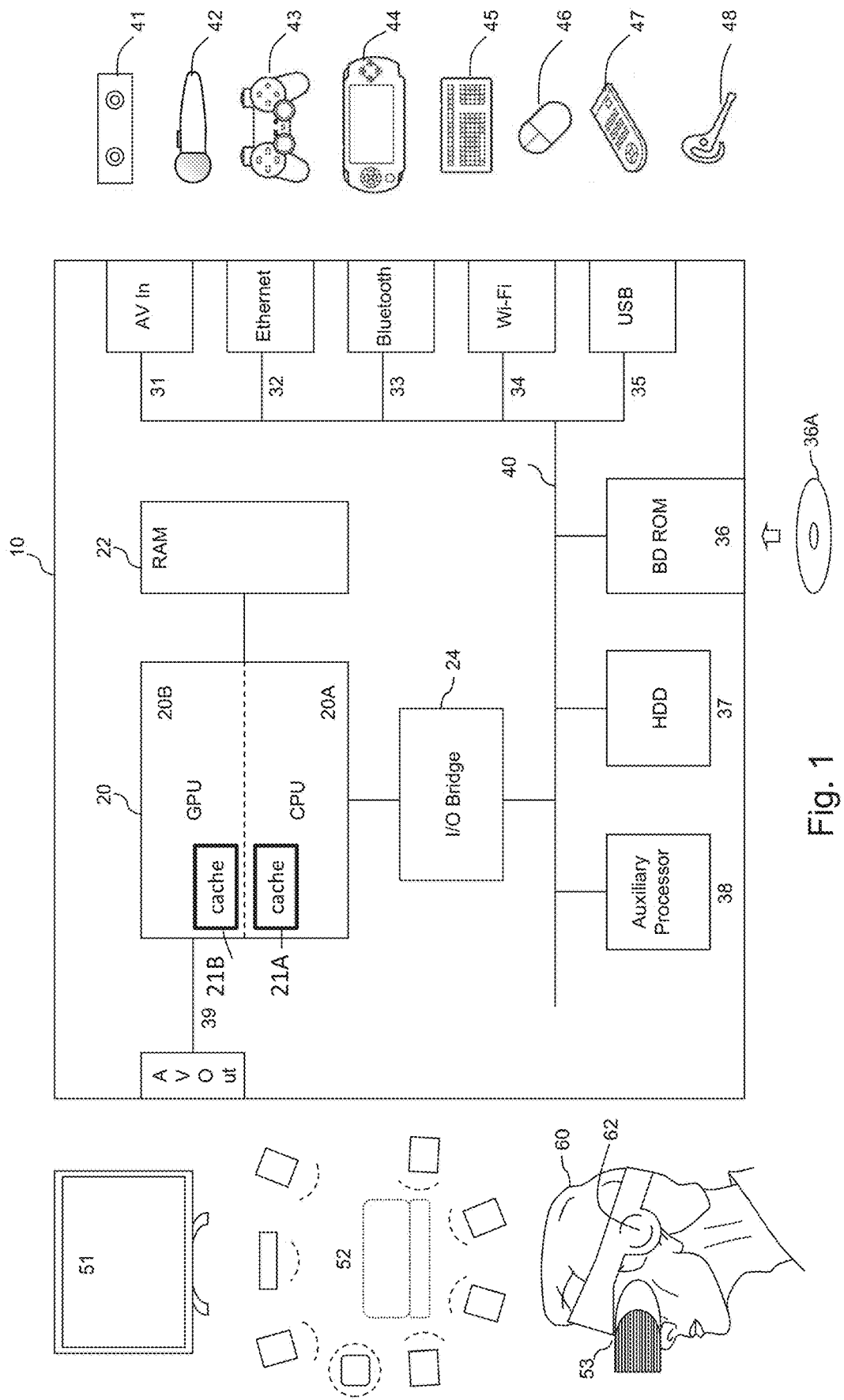
FIG. 1 schematically illustrates an example entertainment device.

Referring now to the drawings, FIG. 1 schematically illustrates the overall system architecture of an example entertainment device such as a games console. A system unit 10 is provided, with various peripheral devices connectable to the system unit.

The system unit 10 comprises a processing unit (PU) 20 that in turn comprises a central processing unit (CPU) 20A and a graphics processing unit (GPU) 20B. The PU 20 has access to a random access memory (RAM) unit 22. One or both of the CPU 20A and the GPU 20B may have access to a cache memory, which may be implemented as part of the respective device and/or as a portion of the RAM 22.

The PU 20 communicates with a bus 40, optionally via an I/O bridge 24, which may be a discrete component or part of the PU 20.

Connected to the bus 40 are data storage components such as a hard disk drive 37 (as an example of a non-transitory machine-readable storage medium) and a Blu-ray® drive 36 operable to access data on compatible optical discs 36A. In place of or in addition to the hard disk drive 37, a so-called solid state disk device (which is a solid state device which is formatted to mimic a hard drive's storage structure in operation) or a flash memory device may be used. Additionally the RAM unit 22 may communicate with the bus 40.

In operation, computer software to control the operation of the device 10 may be stored by the BD-ROM 36A/36 or the HDD 37 (both examples of non-volatile storage) and is executed by the PU 20 to implement the methods discussed here, possibly with a temporary copy of the computer software and/or working data being held by the RAM 22.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI® port.

The peripheral devices may include a monoscopic or stereoscopic video camera 41 such as the PlayStation® Eye; wand-style videogame controllers 42 such as the PlayStation® Move and conventional handheld videogame controllers 43 such as the DualShock® 4; portable entertainment devices 44 such as the PlayStation® Portable and PlayStation® Vita; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 (HMD) worn by a user 60, for example communicating with the device by a wired or wireless connection and powered either by a battery power source associated with the HMD or by power provided using such a wired connection. The HMD may have associated headphones 62 to provide stereo and/or binaural audio to the user 60 wearing the HMD.

In more detail, regarding processing, the CPU 20A may comprise a multi-core processing arrangement, and the GPU 20B may similarly provide multiple cores, and may include dedicated hardware to provide so-called ray-tracing, a technique which will be discussed further below. The GPU cores may also be used for graphics, physics calculations, and/or general-purpose processing.

Optionally in conjunction with an auxiliary audio processor (not shown), the PU 20 generates audio for output via the AV output 39. The audio signal is typically in a stereo format or one of several surround sound formats. Again this is typically conveyed to the television 51 via an HDMI® standard connection. Alternatively or in addition, it may be conveyed to an AV receiver (not shown), which decodes the audio signal format and presented to a home cinema system 52. Audio may also be provided via wireless link to the headset 48 or to the hand-held controller 43. The hand held controller may then provide an audio jack to enable headphones or a headset to be connected to it.

Finally, as mentioned above the video and optionally audio may be conveyed to a head mounted display 53 such as the Sony® PSVR display. The head mounted display typically comprises two small display units respectively mounted in front of the user's eyes, optionally in conjunction with suitable optics to enable the user to focus on the display units. Alternatively one or more display sources may be mounted to the side of the user's head and operably coupled to a light guide to respectively present the or each displayed image to the user's eyes. Alternatively, one or more display sources may be mounted above the user's eyes and presented to the user via mirrors or half mirrors. In this latter case the display source may be a mobile phone or portable entertainment device 44, optionally displaying a split screen output with left and right portions of the screen displaying respective imagery for the left and right eyes of the user. Their head mounted display may comprise integrated headphones, or provide connectivity to headphones. Similarly the mounted display may comprise an integrated microphone or provide connectivity to a microphone.

In operation, the entertainment device may operating under the control of an operating system which may run on the CPU 20A, the auxiliary processor 38, or a mixture of the two. The operating system provides the user with a graphical user interface such as the PlayStation® Dynamic Menu. The menu allows the user to access operating system features and to select games and optionally other content.

Upon start-up, respective users are asked to select their respective accounts using their respective controllers, so that optionally in-game achievements can be subsequently accredited to the correct users. New users can set up a new account. Users with an account primarily associated with a different entertainment device can use that account in a guest mode on the current entertainment device.

Once at least a first user account has been selected, the OS may provide a welcome screen displaying information about new games or other media, and recently posted activities by friends associated with the first user account.

When selected via a menu option, an online store may provide access to game software and media for download to the entertainment device. A welcome screen may highlight featured content. When a game is purchased or selected for download, it can be downloaded for example via the Wi-Fi connection 34 and the appropriate software and resources stored on the hard disk drive 37 or equivalent device. It is then copied to memory for execution in the normal way.

A system settings screen available as part of the operation of the operating system can provide access to further menus enabling the user to configure aspects of the operating system. These include setting up an entertainment device network account, and network settings for wired or wireless communication with the Internet; the ability to select which notification types the user will receive elsewhere within the user interface; login preferences such as nominating a primary account to automatically log into on start-up, or the use of face recognition to select a user account where the video camera 41 is connected to the entertainment device; parental controls, for example to set a maximum playing time and/or an age rating for particular user accounts; save data management to determine where data such as saved games is stored, so that gameplay can be kept local to the device or stored either in cloud storage or on a USB to enable game progress to be transferred between entertainment devices; system storage management to enable the user to determine how their hard disk is being used by games and hence decide whether or not a game should be deleted; software update management to select whether or not updates should be automatic; audio and video settings to provide manual input regarding screen resolution or audio format where these cannot be automatically detected; connection settings for any companion applications run on other devices such as mobile phones; and connection settings for any portable entertainment device 44, for example to pair such a device with the entertainment device so that it can be treated as an input controller and an output display for so-called 'remote play' functionality.

The user interface of the operating system may also receive inputs from specific controls provided on peripherals, such as the hand-held controller 43. In particular, a button to switch between a currently played game and the operating system interface may be provided. Additionally a button may be provided to enable sharing of the player's activities with others; this may include taking a screenshot or recording video of the current display, optionally together with audio from a user's headset. Such recordings may be uploaded to social media hubs such as the entertainment device network, Twitch®, Facebook® and Twitter®.

Rendering of Simulated Video and Audio Environments

Techniques will now be described by which the apparatus of FIG. 1 is operable during operation, such as user-controlled gameplay, to render or generate simulated video and audio environments for presentation to a user.

Video Ray-Tracing

Figure 2:
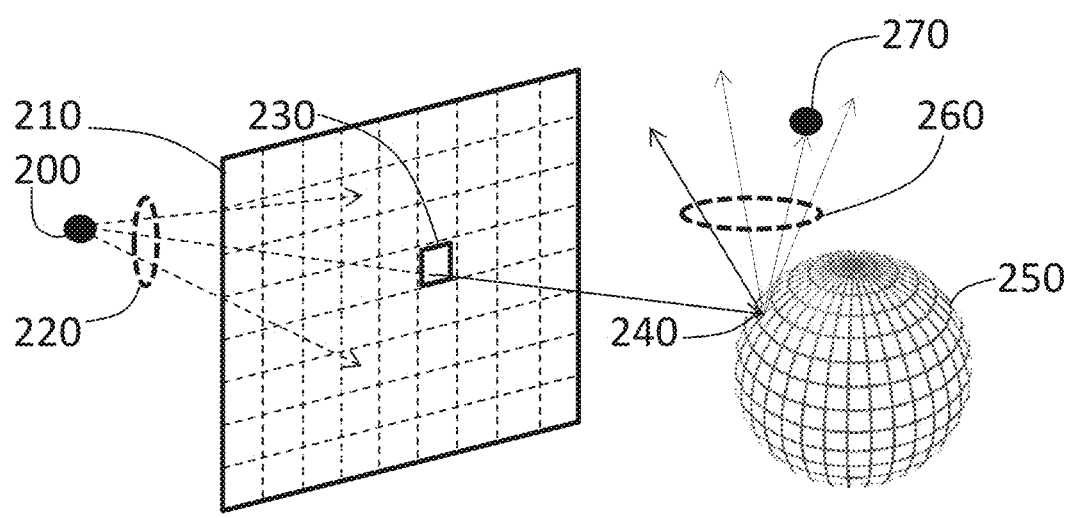
FIG. 2 schematically illustrates a perspective view of a so-called ray-tracing arrangement.
Figure 3:
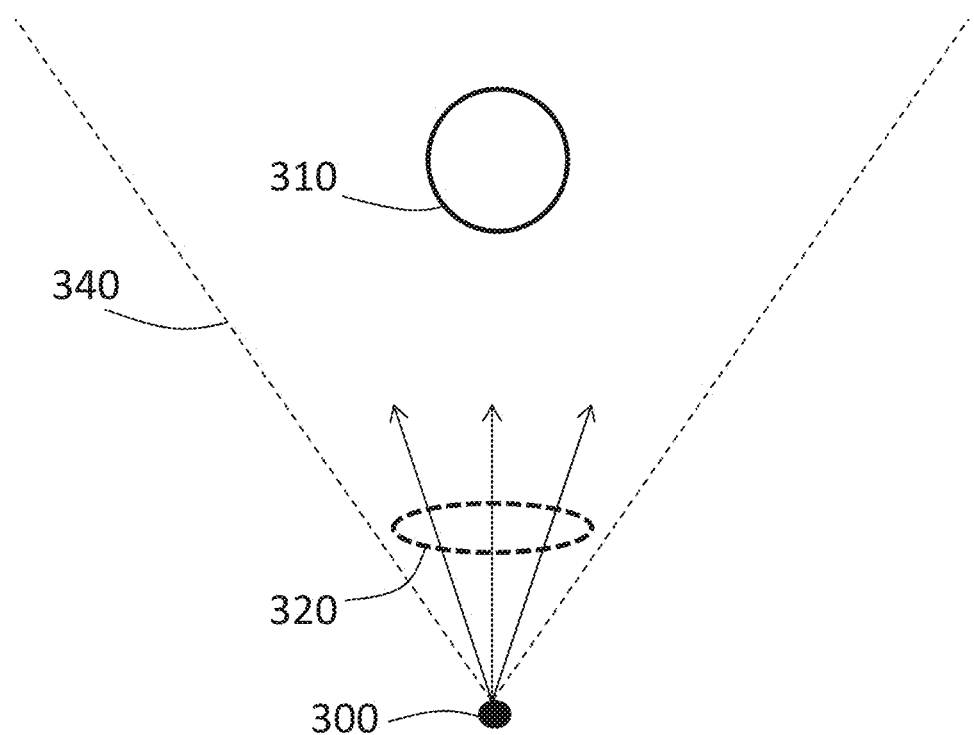
FIG. 3 schematically illustrates a plan view of the arrangement of FIG. 2.

FIGS. 2 and 3 provide schematic representations of a technique referred to as video ray-tracing. This is a technique used during image rendering to generate pixels or samples of an image by tracing so-called rays or light paths and simulating the effects of light encountering objects in the scene being viewed. It can be used as an alternative to other forms of rendering such as so-called scanline rendering. The processing requirements can be high but in example apparatus such as that shown in FIG. 1, dedicated ray-tracing hardware can be provided.

In a physical reality, light from a light source hits an object and is reflected and/or refracted towards the viewing position such as a user's eye or a camera. In contrast, in rendering systems using ray-tracing, the simulation is performed by emitting virtual or simulated "rays" from the viewing position such as a virtual camera and determining what interactions they undergo when they hit an object or a light source (the latter being either directly or after having hit an object.

Referring to FIG. 2, a virtual camera 200 is viewing a virtual object 250 in a virtual environment as modelled, in order to generate a rendered image 210 formed of multiple pixels such as a pixel 230. In this technique, multiple virtual rays 220 are emitted from the virtual camera 200, passing through pixel positions such as the position of the pixel 230 in the image 210 to be rendered. In some cases the virtual rays impact a virtual object, for example at a position 240. At this point on the virtual object 250, the object surface's colour, orientation, reflectivity and other optical properties are taken into account. A further set of virtual rays 260 is emitted from the point 240 to detect whether any of those virtual rays 260 impact a light source or indeed another object. If they do impact a light source such as an example light source 270, properties of that light source are used to determine the lighting incident upon the location 240. In other examples, if the rays 260 impact another object, then depending upon the optical properties of the location 240 and its orientation, a reflection of that other object may be rendered at the surface of the object 250.

FIG. 3 represents a similar arrangement in a schematic plan view, where the virtual camera 300 emits virtual rays 320 towards an object 310 within a field of view or "frustum" 340.

As described, the ray-tracing process can be very computationally expensive and require powerful computing resources to carry out, particularly where the virtual scene includes many virtual objects and virtual light sources. Each virtual ray must be tested as to whether it intersects with each object in the scene.

Bounding Volume Hierarchies

Figure 4:
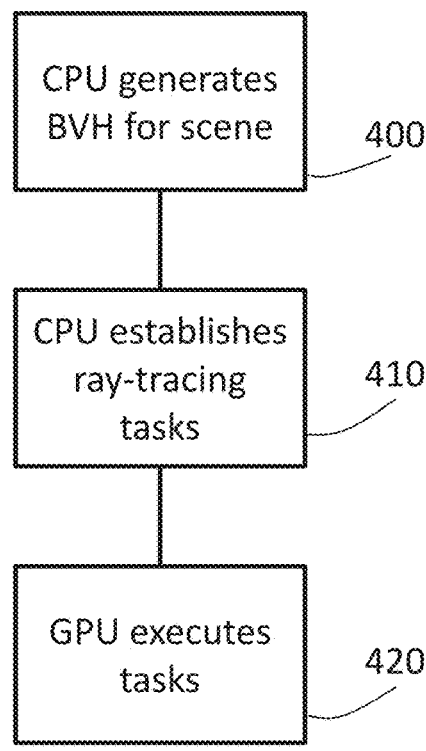
FIG. 4 is a schematic flowchart illustrating a method.
Figure 5:
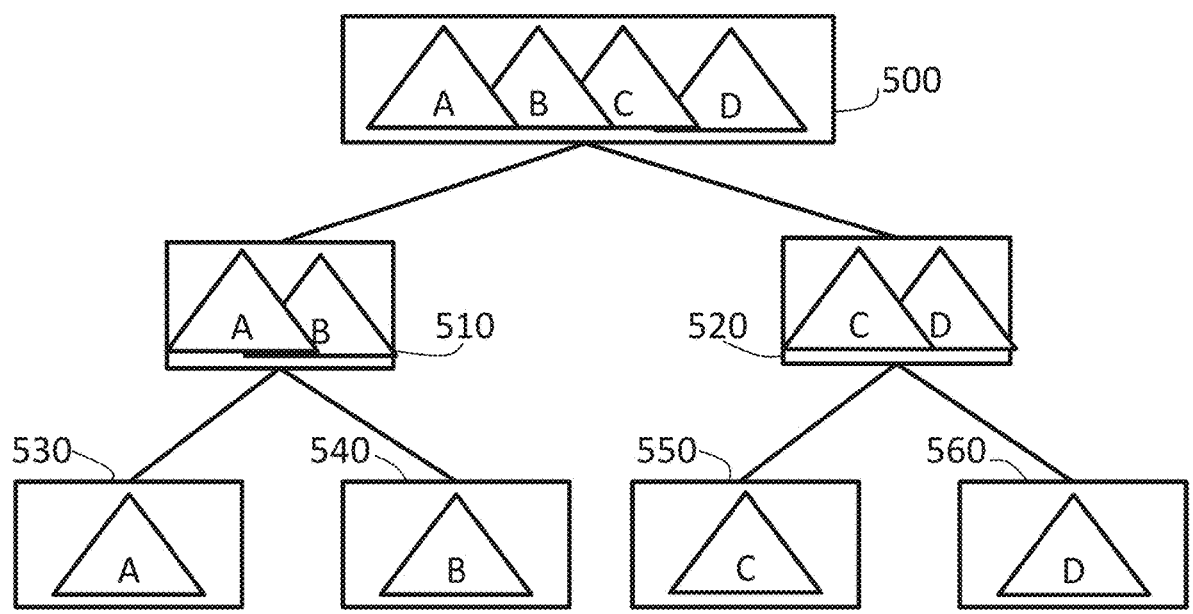
FIG. 5 schematically illustrates an example bounding volume hierarchy (BVH)

So-called bounding volume hierarchies (BVHs) will now be described briefly with reference to FIGS. 4 and 5. FIG. 4 provides an overview of the generation of a BVH and FIG. 5 provides a schematic example of a BVH itself.

A BVH is a hierarchical tree structure of volumes which provides a way of representing objects within a virtual environment. Each geometric object in the generated virtual environment is contained within or "wrapped" in a bounding volume forming the lowest level or "leaf nodes" of the tree structure. In FIG. 5, four example geometric objects A, B, C, D are represented, with each having a respective leaf node 530, 540, 550, 560 providing a definition of a bounding volume containing just that geometric object. At a next higher level, the leaf nodes are grouped as small localised sets of leaf nodes and are enclosed within a larger bounding volumes defined by tree structure nodes 510, 520. These in turn are recursively grouped and enclosed within other, more extensive, bounding volumes defined by higher level nodes such as a node 500 of FIG. 5. Ultimately, there will be a single bounding volume as a highest level node in the tree structure.

Referring back to FIG. 4, the processes involved in rendering an image can be carried out by the CPU 20A and/or the GPU 20B, for example with each having a respective category of roles within the overall process. Typically, in a real-time system such as a computer games machine of the type shown in FIG. 1, the rendering tasks associated with generating a single output image or frame have to be completed within a frame period, or at least the system has to be capable of outputting one frame at each frame period.

At a schematic step 400, modelling of the virtual scene may be performed by the CPU 20A which generates the geometric objects within the virtual scene and assigns them to nodes within a BVH. At a step 410, the CPU 20A establishes a set of ray-tracing tasks and communicates these to the GPU 20B which then executes the ray-tracing tasks at a step 420. This arrangement is purely by way of example and this particular division of processing effort between the CPU 20A and the GPU 20B is purely one example of how this may be done.

Audio Rendering

An example arrangement for rendering an audio output for a user of the entertainment device will now be described. In this example, so-called audio ray tracing is used.

Figure 6:
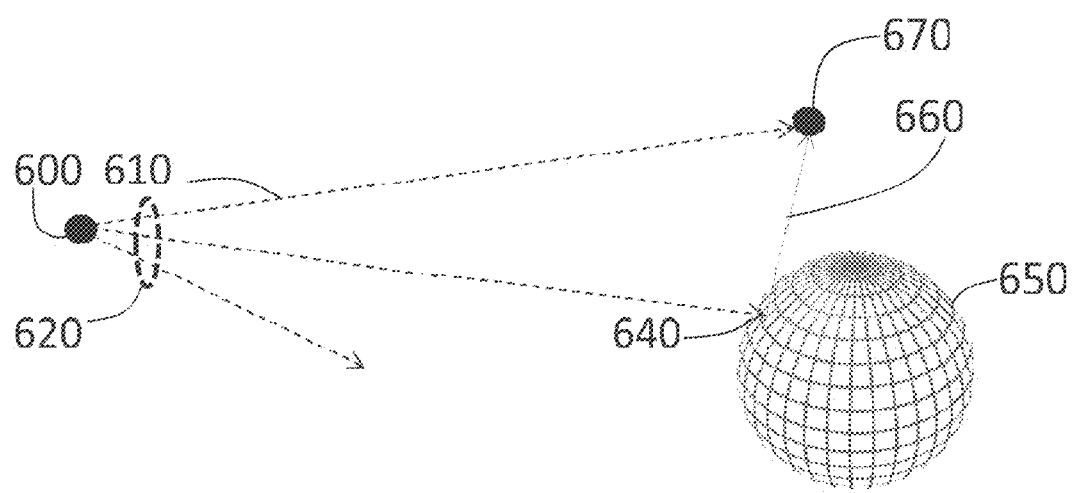
FIG. 6 is a schematic flowchart illustrating a method.

Referring to FIG. 6, a virtual listening position or microphone 600 is responsive to an audio content generated by a virtual sound source 650.

Assuming that there is a direct or line-of-sight audio propagation path between the virtual listening position 600 and the virtual sound source 650, then a component of the rendered sound at the virtual listening position 600 will be a directly propagated component along the path 610. However, as in real life, contributions to a sound as heard by the user may include the directly propagated component and reflected or reverberated components by other paths. These components will arrive at the user's ears (or at the virtual listening position in the present example) later than the directly propagated component, and these reverberated components are modelled by a ray tracing technique.

In operation, multiple virtual "rays" 620 are emitted from the virtual listening position 600. In some cases the virtual rays impact a virtual object, for example at a position 640. At this point on the virtual object 650, the object surface's orientation, reflectivity/absorption, and any other properties relevant to audio propagation are taken into account. A further virtual ray 660 is emitted from the point 640 in a direction dependent upon the object surface's normal at that location and a detection is made as to whether such a virtual ray 660 is directed towards a virtual audio source or indeed another object. If it does impact a virtual audio source 670, properties of that virtual audio source are used, along with the length of the reverberated propagation path (or at least the difference over the directly propagated path) and the reflection/absorption properties at the location 640 to determine a further, delayed, contribution to the rendered audio signal at the virtual listening position 600.

It will be appreciated that (a) many of the rays emitted from the virtual listening position 600 do not reach a virtual audio source and so provide no contribution to the rendered sound; (b) multiple virtual audio sources, each with (potentially) a direct propagation path and zero or more reverberated paths may contribute to the rendered audio signal at the virtual listening position 600.

In practical implementations, both the number of rays modelled and the number of successive reflections may need to be capped in order to allow a practical implementation of, for example, the PU 20, to perform the necessary tasks for audio rendering during a period of time allocated to those tasks.

Generation of Environment Model

In some previously proposed arrangements, the environment model used for audio rendering was the same as that used for video rendering. While such an arrangement has the potential advantage of simplicity, it may well be that the geometry of a virtual environment may look good but may not necessarily give a desired audio effect. This could be for various reasons, such as a potentially unrealistic audio reflectivity associated with the video rendering virtual environment.

Figure 7:
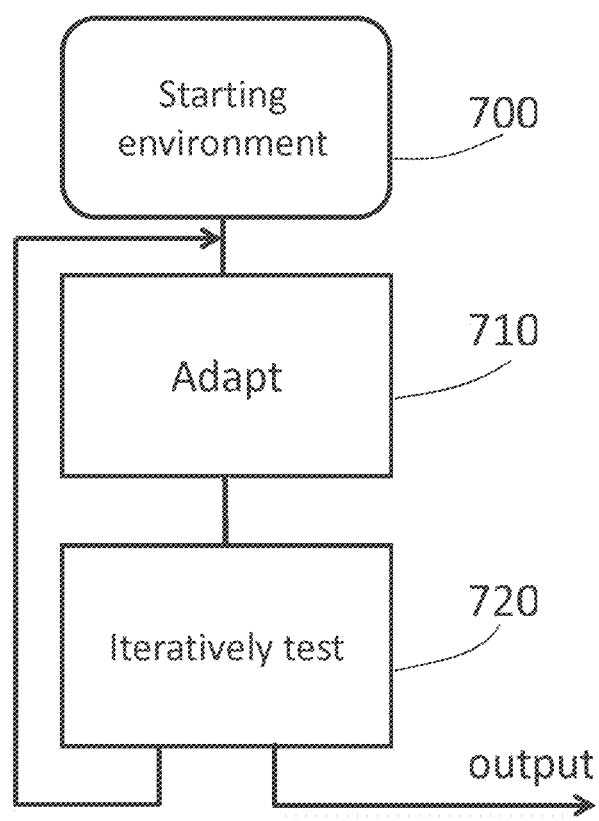
FIG. 7 schematically illustrates a lighting culling technique.

Therefore, in example embodiments, a separate audio rendering environment is generated. FIG. 7 provides a schematic overview of this process.

Referring to FIG. 7, the process commences with a starting environment 700. In some examples, this could be the virtual environment used for video rendering, for example as defined by the BVHs discussed above. In other examples, it could be a different (such as an independent) starting environment such as a cuboid box.

An iterative process then takes place in which, at a step 710, the prevailing environment (the starting environment 700 at a first iteration) is adapted or modified for use as an audio rendering environment. A test may be performed at a step 720 to detect whether the adapted environment meets a required criterion or plural required criteria. If it does not then control returns to the step 710 for further adaptations to be performed. If the test at the step 720 is past then the prevailing adapted environment is output for use in audio rendering.

As mentioned above, the steps 710, 720 may be performed by separate data processing apparatus, for example during the authoring process associated with the release of a computer game. In such examples, the prepared audio environment(s) can be stored as part of computer game code or resources and issued as part of the issued game package to be loaded onto and/or used by the apparatus of FIG. 1.

This therefore provides an example of iteratively modifying the starting version of the second environment representation by a succession of two or more iterations, each iteration other than a last iteration generating a modified representation to be further modified by a next iteration. Following the step 710 by the step 720 provides an example of performing a given iteration; and testing whether the prevailing second environment representation, as generated by the given iteration, meets one or more predetermined criteria and if so, terminating the succession of iterations, and if not, repeating the performing and testing steps.

Example Data Processing Apparatus

Figure 8:
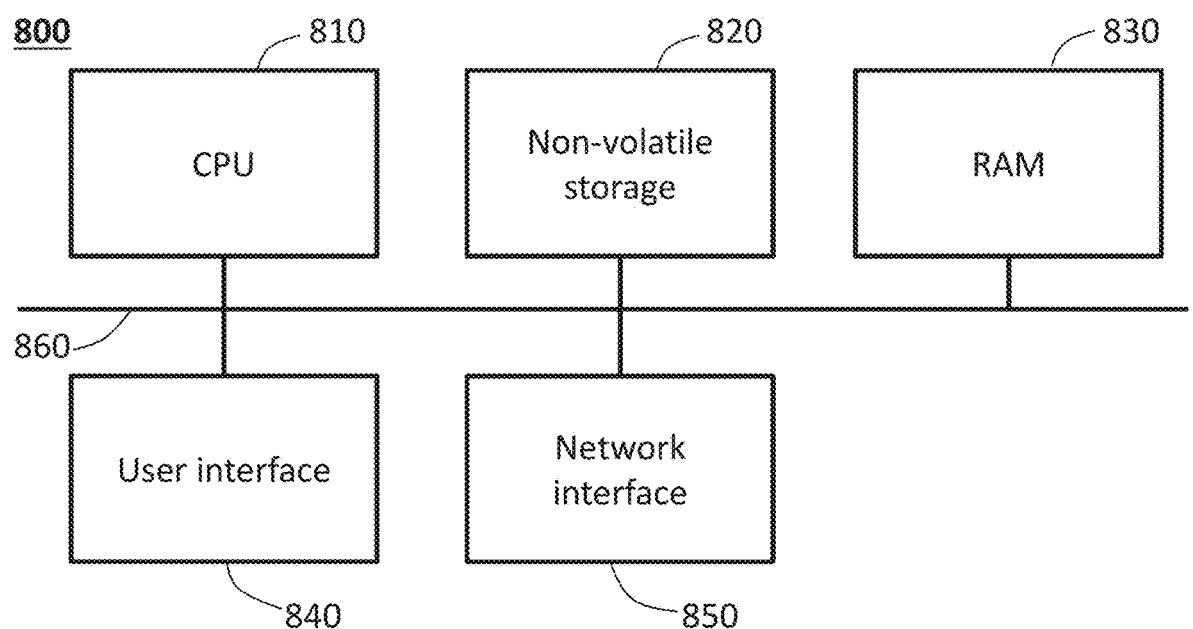
FIG. 8 is a schematic flowchart illustrating a method.

FIG. 8 provides a schematic example of a data processing apparatus 800 suitable for performing the steps 710, 720. The example apparatus comprises a central processing unit (CPU) 810, non-volatile storage 820 (for example, a magnetic or optical disk device, a so-called solid state disk (SSD) device, flash memory or the like, providing an example of a machine-readable non-volatile storage device to store computer software by which the apparatus 800 performs one or more of the present methods), a random access memory (RAM) 830, a user interface 840 such as one or more of a keyboard, mouse and a display, and a network interface 850, all interconnected by a bus structure 860. In operation, computer software to control the operation of the apparatus 800 is stored by the non-volatile storage 820 and is executed by the CPU 810 to implement the methods discussed here, possibly with a temporary copy of the computer software and/or working data being held by the RAM 830.

FIG. 8 and indeed FIG. 1 therefore provide examples of apparatus comprising a processor 810, 20 configured to:
  generate a first environment representation for rendering a video representation of a virtual environment;
  generate a second environment representation for rendering an audio output at a virtual listening position within the virtual environment in response to sounds generated by one or more virtual sound sources within the virtual environment;
  in which the first and second environment representations comprise respective different geometrical representations of the virtual environment;
  in which processor is configured to generate the second environment representation by:
  generating a starting version of the second environment representation; and
  modifying the starting version of the second environment representation.

In the case of at least FIG. 1, there is provided an example of video game apparatus comprising such apparatus.

Example Adaptations (Step 710)

The following are examples of adaptations which may be performed in the method of FIG. 7.

Example 1—Directly Adapting the Video Environment

Typically, a video environment has to be provided or generated in order for a video output to be rendered for presentation to the user. Example adaptations at the step 710 may include one or more of:

Smoothing so as to remove detail, for example by a low-pass spatial filter; in some examples, the resolution of the simulated audio environment may be limited to the maximum resolution of the audio ray tracing process (which is to say, there is arguably little point providing details within the simulated audio environment which are smaller than the closest separation of adjacent rays cast by the audio ray tracing process);

Similarly, removing altogether any small objects in the video environment, for example objects smaller than the ray tracing resolution of the audio ray tracing process;

Adaptation of the audio reflectivity of surfaces defined by the video geometry, for example to increase the simulated audio absorption by those surfaces relative to a direct mapping of the surface properties of the video environment;

Example 2—Generating the Audio Environment from a Generic Starting Environment 700

Here, the starting environment 700 may be a generic starting environment rather than being a version of the video rendering environment. An example is a cuboid box or a small number (for example up to 8) cuboid boxes placed adjacent to one another to form a composite virtual environment. The one or more cuboid boxes may be sized and shaped generally to corresponds to the size and orientation of significant features in the video environment, such as the extremities of a room defined by the video environment. The adaptations at the step 710 may comprise moving, deleting, rotating or otherwise modifying portions of the prevailing environment so as to approximate more closely the shape and configuration of the video environment.

Example 3—Generating an Environment to Give a Desired Audio Response Using Machine Learning The processing function (in this context) of the steps 710 and 720 may be performed by, for example, a trained machine-learning processor running on, for example, the apparatus of FIG. 8.

Here, a desired audio response may be defined in advance, for example by empirical measurements in a real environment which is being modelled by the virtual environment in use. The empirical measurements may involve, for example, positioning a real microphone at one or more sample listening locations within the real environment and providing an impulse noise (such as a loud bang) at an audio source location within the real environment. By recording the captured audio and, in some examples, removing the captured direct propagation (delete the "bang") the response of the real environment can be captured and used as part of ground truth data to train a machine learning system.

Figure 9:
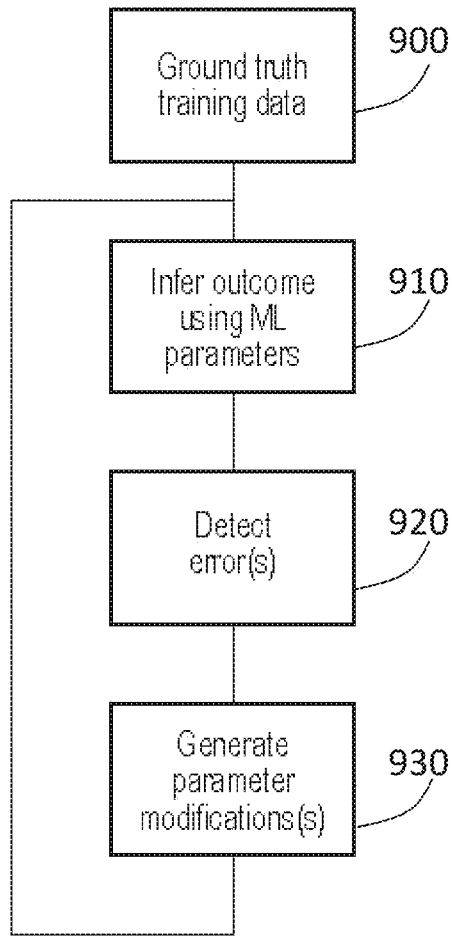
FIG. 9 schematically illustrates an object culling technique.
Figure 10:
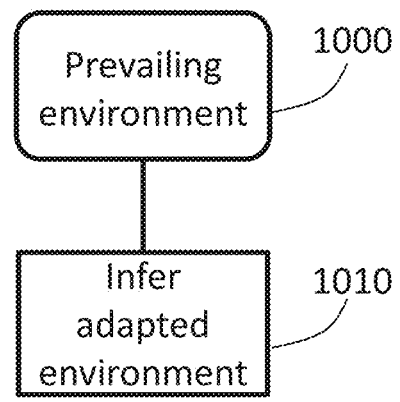
FIGS. 10 and 11 are schematic flowcharts illustrating respective methods.

FIG. 9 schematically illustrates a training process for such a processor and FIG. 10 schematically illustrates an inference process in operational use of such a processor.

Referring to FIG. 9, the training process is performed with respect to so-called ground truth training data 900. This can include ground truth input data such as a desired audio response (as discussed above) or the like.

During the training phase, an outcome, comprising an audio environment or a modification to an audio environment, is inferred using machine learning parameters such as machine learning weights. At a step 920, an error function between the outcomes associated with the ground truth training data 900 and the audio response of inferred outcomes at the step 910 is detected, and at a step 930, modifications to the parameters such as machine learning weights are generated and applied for the next iteration of the steps 910, 920, 930. Each iteration can be carried out using different instances of the ground truth training data 900, for example.

In an inference phase of the trained machine-learning processor (FIG. 10), a prevailing environment is provided (for example, at the input to the step 710) at a step 1000, and then, at a step 1010, an outcome, in terms of a modified environment, is inferred using the trained machine learning parameters generated as described above.

Testing at the Step 720

The step 720 can involve any of the following decisions:
accept a first-generation or nth iteration modified environment, and, where and may be a predetermined integer of at least 1; and/or
compare the audio response of the prevailing audio environment with a desired audio response and detect whether a difference metric (such as an average squared difference in the power spectrums of the responses (desired vs actual) for a set of predetermined test audio signals) is below a threshold level.

Example of Modifications

Figure 11:
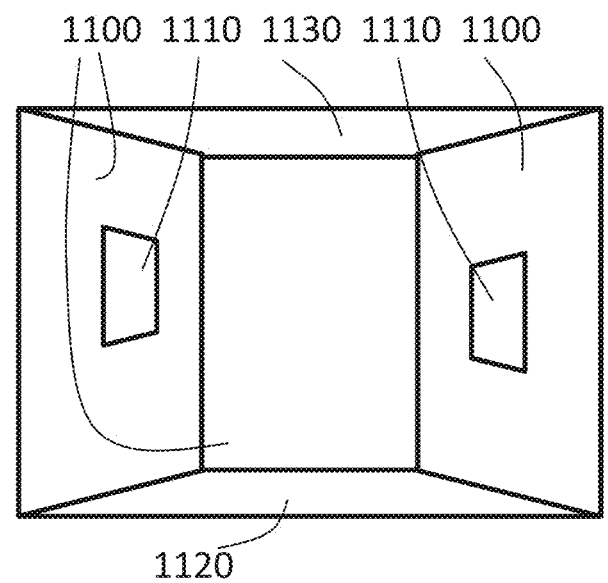

FIG. 11 schematically illustrates a second environment representation during the processing discussed above, or in other words a starting version 700 or a prevailing version is provided to a further iteration of the step 710. The second environment representation, once the processing has been completed, is for use in rendering an audio output at a virtual listening position within the virtual environment in response to sounds generated by one or more virtual sound sources within the virtual environment. The representation shown schematically in FIG. 11 is a geometrical representation of the underlying virtual environment which, at least after a first iteration of the step 710, is different to the geometrical representation generated for rendering a video representation of the virtual environment.

In the example shown, the second environment representation defines geometrical features such as walls 1100, windows 1110, a floor 1120 and a ceiling 1130. These can be represented in various ways such as by a geometrical mesh associated with a texture, by a bounding volume hierarchy (BVH) or other representation.

The step 710 can comprise changing, adding or removing one or more of the geometrical features. For example, in the second environment representation to be used for audio rendering, the windows 1110 may be removed or may be converted into apertures rather than closed windows. In other examples, the step 710 can comprise changing an audio propagation property of the one or more geometrical features, for example changing the audio reflectivity of the windows 1110 to be identical to that of the surrounding walls 1100, changing the audio absorption of all of the walls and windows to be greater than that implied by the video rendering texture or the like.

Summary Method

Figure 12:
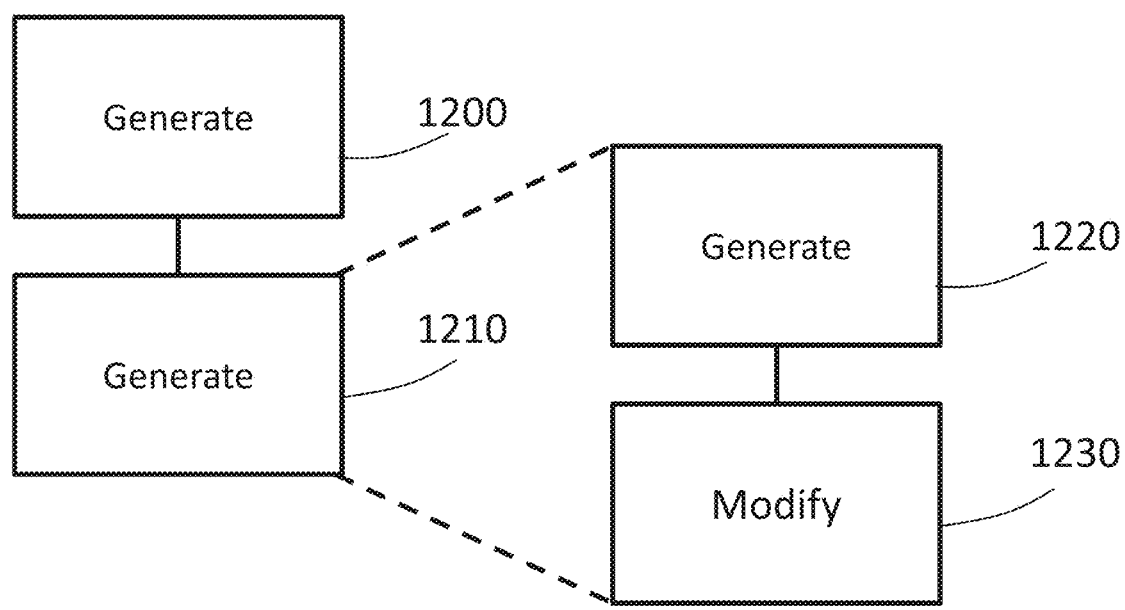
FIG. 12 schematically illustrates an apparatus.

FIG. 12 is a schematic flowchart illustrating a summary method comprising:
generating (at a step 1200) a first environment representation for rendering a video representation of a virtual environment; and generating (at a step 1210) a second environment representation for rendering an audio output at a virtual listening position within the virtual environment in response to sounds generated by one or more virtual sound sources within the virtual environment;

in which the first and second environment representations comprise respective different geometrical representations of the virtual environment;

in which the step 1210 of generating the second environment representation comprises:

generating (at a step 1230) a starting version of the second environment representation; and modifying (at a step 1240) the starting version of the second environment representation.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

The invention claimed is:

1. A method comprising:
generating a first environment representation for rendering a video representation of a virtual environment; and
generating a second environment representation for rendering an audio output at a virtual listening position within the virtual environment in response to sounds generated by one or more virtual sound sources within the virtual environment;
in which the first and second environment representations comprise respective different geometrical representations of a same subset of content within an entirety of the virtual environment;
in which the step of generating the second environment representation comprises:
generating a starting version of the second environment representation; and
modifying the starting version of the second environment representation.

2. The method of claim 1, in which the starting version of the second environment representation is the same as the first environment representation.

3. The method of claim 1, in which the starting version of the second environment representation is different to the first environment representation.

4. The method of claim 1, in which the modifying step comprises iteratively modifying the starting version of the second environment representation by a succession of two or more iterations, each iteration other than a last iteration generating a modified representation to be further modified by a next iteration.

5. The method of claim 4, in which the iteratively modifying step comprises:
performing a given iteration; and
testing whether the modified representation, as generated by the given iteration, meets one or more predetermined criteria and if so, terminating the succession of iterations, and if not, repeating the performing and testing steps.

6. The method of claim 1, in which the modifying step comprises changing, adding or removing one or more geometrical features.

7. The method of claim 6, in which the step of changing one or more geometrical features comprises changing an audio propagation property of the one or more geometrical features.

8. The method of claim 1, comprising: executing at least the modifying step by a trained machine-learning processor.

9. A non-transitory, machine-readable storage medium which stores computer software which, when executed by a computer, causes the computer to perform a method comprising:
generating a first environment representation for rendering a video representation of a virtual environment; and
generating a second environment representation for rendering an audio output at a virtual listening position within the virtual environment in response to sounds generated by one or more virtual sound sources within the virtual environment;
in which the first and second environment representations comprise respective different geometrical representations of a same subset of content within an entirety of the virtual environment;
in which the step of generating the second environment representation comprises:
generating a starting version of the second environment representation; and
modifying the starting version of the second environment representation.

10. Apparatus comprising a processor configured to:
generate a first environment representation for rendering a video representation of a virtual environment;
generate a second environment representation for rendering an audio output at a virtual listening position within the virtual environment in response to sounds generated by one or more virtual sound sources within the virtual environment;
in which the first and second environment representations comprise respective different geometrical representations of a same subset of content within an entirety of the virtual environment;
in which processor is configured to generate the second environment representation by:
generating a starting version of the second environment representation; and
modifying the starting version of the second environment representation.

11. Video game apparatus comprising the apparatus of claim 10.

* * * * *